US012560356B2

(12) United States Patent
Everly et al.

(10) Patent No.: US 12,560,356 B2
(45) Date of Patent: Feb. 24, 2026

(54) HEATER BUNDLES HAVING VIRTUAL SENSING FOR THERMAL GRADIENT COMPENSATION

(71) Applicant: Watlow Electric Manufacturing Company, St. Louis, MO (US)

(72) Inventors: Mark Everly, St. Charles, MO (US); Jeremy Quandt, Winona, MN (US); Steven T. Jystad, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 1279 days.

(21) Appl. No.: 17/197,556

(22) Filed: Mar. 10, 2021

(65) Prior Publication Data

US 2021/0190380 A1 Jun. 24, 2021

Related U.S. Application Data

(63) Continuation-in-part of application No. 16/272,668, filed on Feb. 11, 2019, now Pat. No. 11,781,784,
(Continued)

(51) Int. Cl.
*F24H 15/37* (2022.01)
*F24H 1/10* (2022.01)
(Continued)

(52) U.S. Cl.
CPC ............ *F24H 15/37* (2022.01); *F24H 1/103* (2013.01); *F24H 9/2028* (2013.01);
(Continued)

(58) Field of Classification Search
None
See application file for complete search history.

(56) References Cited

U.S. PATENT DOCUMENTS 686,288 A * 11/1901 Griffing .................. F22B 1/287
392/399
710,429 A * 10/1902 Collins et al. ....... A61N 1/0492
307/132 R
(Continued)

FOREIGN PATENT DOCUMENTS

CN 101142852 3/2008
CN 103826482 5/2014
(Continued)

OTHER PUBLICATIONS

First Exam Report issued in corresponding IN Application No. 202214012842, issued Oct. 12, 2022, 6 pages.
(Continued)

*Primary Examiner* — Thor S Campbell
(74) *Attorney, Agent, or Firm* — Burris Law, PLLC

(57) ABSTRACT

A system includes a heater bundle having at least one heater assembly with a plurality of heater units. At least one of the heater units defines at least one independently controlled heating zone, and a plurality of power conductors are electrically connected to the heater units. A power supply device includes a controller configured to modulate power to the at least one independently controlled heating zone through the power conductors, and the controller is configured to calculate temperature within the at least one heater unit based on a predefined model and at least one input, and the controller modulates power to the at least one heater unit based on the calculated temperature.

17 Claims, 17 Drawing Sheets

Related U.S. Application Data which is a continuation of application No. 15/058,838, filed on Mar. 2, 2016, now Pat. No. 10,247,445.

(51) Int. Cl.

| | |
|---|---|
| ***F24H 9/20*** | (2022.01) |
| ***F24H 15/124*** | (2022.01) |
| ***F24H 15/144*** | (2022.01) |
| ***F24H 15/20*** | (2022.01) |
| ***F24H 15/238*** | (2022.01) |
| ***F24H 15/25*** | (2022.01) |
| ***H05B 1/02*** | (2006.01) |
| ***H05B 3/04*** | (2006.01) |
| ***H05B 3/48*** | (2006.01) |
| ***H05B 3/82*** | (2006.01) |
| *F24H 15/128* | (2022.01) |
| *F24H 15/269* | (2022.01) |
| *F24H 15/421* | (2022.01) |

(52) U.S. Cl.

CPC ......... *F24H 15/124* (2022.01); *F24H 15/144* (2022.01); *F24H 15/20* (2022.01); *F24H 15/238* (2022.01); *F24H 15/25* (2022.01); *H05B 1/0283* (2013.01); *H05B 3/04* (2013.01); *H05B 3/48* (2013.01); *H05B 3/82* (2013.01); *F24H 15/128* (2022.01); *F24H 15/269* (2022.01); *F24H 15/421* (2022.01); *H05B 2203/014* (2013.01)

(56) References Cited

U.S. PATENT DOCUMENTS

| | | | | | |
|---|---|---|---|---|---|
| 1,258,767 | A * | 3/1918 | Hadaway, Jr. | H05B 3/80 | 392/501 |
| 1,320,890 | A * | 11/1919 | Moffat | H01C 1/14 | 219/486 |
| 1,445,501 | A * | 2/1923 | Dwinall | H05B 3/78 | 392/443 |
| 1,451,863 | A * | 4/1923 | Clark | F24H 1/202 | 219/486 |
| 1,525,176 | A * | 2/1925 | Givens | E21B 36/04 | 392/301 |
| 1,674,369 | A * | 6/1928 | Mcquinn | F24H 1/202 | 392/452 |
| 1,680,104 | A * | 8/1928 | Head | H05B 3/46 | 392/338 |
| 1,759,281 | A * | 5/1930 | Rosenberger | F24H 1/102 | 392/500 |
| 1,787,450 | A * | 1/1931 | Lonergan | F24H 9/2021 | 219/512 |
| 1,849,175 | A * | 3/1932 | Clark | F24H 1/225 | 219/508 |
| 2,104,848 | A * | 1/1938 | Clark | H01H 37/60 | 337/392 |
| 2,213,464 | A * | 9/1940 | Fogwell | F24H 9/1818 | 392/500 |
| 2,375,871 | A * | 5/1945 | Reifenberg | F24H 1/202 | 126/362.1 |
| 2,437,262 | A * | 3/1948 | Levitt | F24H 9/2021 | 219/486 |
| 2,498,054 | A * | 2/1950 | Taylor | H05B 1/0277 | 219/486 |
| 3,340,382 | A * | 9/1967 | Lennox | H05B 3/82 | 219/544 |
| 3,582,616 | A | 6/1971 | Wrob | | |
| 3,873,807 | A * | 3/1975 | Mohr | F24H 1/225 | 392/338 |
| 4,039,995 | A | 8/1977 | Walton et al. | | |
| 4,090,062 | A * | 5/1978 | Phillips | H02J 3/14 | 219/486 |
| 4,132,262 | A * | 1/1979 | Wibell | F25D 17/02 | 165/206 |
| 4,908,498 | A * | 3/1990 | Kivela | G05D 23/1917 | 219/486 |
| 5,023,430 | A * | 6/1991 | Brekkestran | A41D 13/0051 | 219/486 |
| 5,105,067 | A * | 4/1992 | Brekkestran | G05D 23/1934 | 219/486 |
| 5,197,375 | A * | 3/1993 | Rosenbrock | G05D 23/22 | 99/335 |
| 5,280,422 | A | 1/1994 | Moe et al. | | |
| 5,831,250 | A * | 11/1998 | Bradenbaugh | H05B 1/0283 | 219/494 |
| 5,844,211 | A * | 12/1998 | Henry | H05B 3/82 | 219/386 |
| 6,363,216 | B1 * | 3/2002 | Bradenbaugh | F24H 1/202 | 219/441 |
| 6,374,046 | B1 * | 4/2002 | Bradenbaugh | F24H 15/407 | 219/492 |
| 6,566,633 | B2 * | 5/2003 | Kitada | G05D 23/1934 | 219/486 |
| 6,946,626 | B2 * | 9/2005 | Hirayama | G05B 15/02 | 219/492 |
| 7,196,295 | B2 | 3/2007 | Fennewald et al. | | |
| 7,257,464 | B2 * | 8/2007 | Fennewald | H05B 1/02 | 700/297 |
| 8,219,258 | B1 * | 7/2012 | Almeida | G05B 15/02 | 700/297 |
| 9,065,294 | B2 * | 6/2015 | Kambara | H02J 13/00004 | |
| 2002/0011480 | A1 * | 1/2002 | Schilling | H05B 3/746 | 219/448.11 |
| 2002/0015585 | A1 * | 2/2002 | Jensen | H05B 3/82 | 392/501 |
| 2002/0040898 | A1 * | 4/2002 | Von Arx | B29C 65/3448 | 219/535 |
| 2004/0039487 | A1 | 2/2004 | Fennewald et al. | | |
| 2005/0067405 | A1 * | 3/2005 | DeAngelis | H05B 3/34 | 219/549 |
| 2017/0254564 | A1 | 9/2017 | Everly et al. | | |
| 2017/0254565 | A1 | 9/2017 | Everly et al. | | |
| 2019/0170400 | A1 | 6/2019 | Everly et al. | | |
| 2019/0336974 | A1 | 11/2019 | De Wijs et al. | | |
| 2019/0338422 | A1 | 11/2019 | Durbin et al. | | |
| 2020/0232677 | A1 | 7/2020 | Everly et al. | | |

FOREIGN PATENT DOCUMENTS

| | | | |
|---|---|---|---|
| CN | 104025702 | | 9/2014 |
| EP | 3737206 | | 11/2020 |
| JP | 2012083121 | A | 4/2012 |
| JP | 2019510916 | A | 4/2019 |
| KR | 1020060131054 | A | 12/2006 |
| KR | 2020140004692 | | 8/2014 |
| KR | 1020200021560 | A | 2/2020 |
| WO | 2004019143 | | 3/2004 |
| WO | 2013033402 | | 3/2013 |
| WO | 2013034458 | | 3/2013 |
| WO | 2018009768 | A1 | 1/2018 |

OTHER PUBLICATIONS

Extended European Search Report issued in corresponding EP Application No. 22161472.0, issued Nov. 17, 2022, 10 pages.

Office Action issued in corresponding JP Application No. 2022-037256, issued Nov. 18, 2025 and an English translation, 10 pages.

Office Action issued in corresponding KR Application No. 10-2022-0029708, issued Nov. 16, 2025, 8 pages.

* cited by examiner

HEATER BUNDLES HAVING VIRTUAL SENSING FOR THERMAL GRADIENT COMPENSATION

CROSS-REFERENCE TO RELATED APPLICATIONS

The present application is a continuation-in-part application of U.S. Ser. No. 16/272,668, filed Feb. 11, 2019, and titled "Heater Bundle for Adaptive Control," which is a continuation application of U.S. Ser. No. 15/058,838, now U.S. Pat. No. 10,247,445, filed Mar. 2, 2016. The contents of the above disclosures are incorporated herein by reference in their entirety.

FIELD

The present disclosure relates to electric heaters, and more particularly to heaters for heating a fluid, such as a fluid within heat exchangers.

BACKGROUND

The statements in this section merely provide background information related to the present disclosure and may not constitute prior art.

A fluid heater may be in the form of a cartridge heater, which has a rod configuration to heat fluid that flows along or past an exterior surface of the cartridge heater. The cartridge heater may be disposed inside a heat exchanger for heating the fluid flowing through the heat exchanger. If the cartridge heater is not properly sealed, moisture and fluid may enter the cartridge heater to contaminate the insulation material that electrically insulates a resistive heating element from the metal sheath of the cartridge heater, resulting in dielectric breakdown and consequently heater failure. The moisture can also cause short circuiting between power conductors and the outer metal sheath. The failure of the cartridge heater may cause costly downtime of the apparatus that uses the cartridge heater.

SUMMARY

This section provides a general summary of the disclosure and is not a comprehensive disclosure of its full scope or all of its features.

The present disclosure provides a heater system that includes a heater bundle with at least one heater assembly having a plurality of heater units, at least one of the heater units defining at least one independently controlled heating zone. A plurality of power conductors are electrically connected to the heater units, and a power supply device includes a controller configured to modulate power to the at least one independently controlled heating zone through the power conductors. The controller is configured to calculate temperature within the at least one heater unit based on a predefined model and at least one input, and the controller modulates power to the at least one heater unit based on the calculated temperature.

In variations of this heater system, which may be implemented individually or in any combination: the at least one heater unit is an end heater unit; the at least one input comprises temperature at another location within the heater bundle; the at least one input comprises at least one temperature of at least one of the plurality of heater units; the at least one input comprises power consumption of the heater bundle; the at least one input comprises average power consumption of the heater bundle over a predetermined time period; the at least one input comprises a voltage of the heater bundle and/or a voltage of at least one of the heater units; the at least one input comprises a current of the heater bundle and/or a current of at least one of the heater units; the at least one input comprises a current leakage of the heater bundle; the at least one input comprises an insulation resistance of the heater bundle; the at least one input comprises at least one of a fluid temperature, a fluid speed, a fluid velocity, and a fluid mass flow rate; the controller calculates temperature by supplying a known current to the plurality of heater units, measuring a voltage of the at least one independently controlled heating zone, and comparing the measured voltage to a nominal voltage associated with the known current to identify voltage deviations and/or corresponding resistance deviations; and the controller calculates temperature by supplying a known voltage to the plurality of heater units, measuring a current of the at least one independently controlled heating zone, and comparing the measured current to a nominal current associated with the known voltage to identify current deviations and/or corresponding resistance deviations.

In another variation of this heater system, an apparatus for heating fluid comprises a sealed housing defining an internal chamber and having a fluid inlet and a fluid outlet, and the at least one heater assembly is disposed within the internal chamber of the housing. The at least one heater assembly is adapted to provide a responsive heat distribution to a fluid within the housing. The heat distribution is "responsive" based on the implementation of the virtual sensing as described herein.

In another form of the present disclosure, a heater system comprises a heater assembly comprising a plurality of heater units, at least one heater unit defining at least one independently controlled heating zone. A plurality of power conductors are electrically connected to the heater units, and a power supply device includes a controller configured to modulate power to the at least one independently controlled heating zone through the power conductors. The controller is configured to calculate temperature within the at least one heater unit based on a predefined model and at least one input, and the controller modulates power to the at least one heater unit based on the calculated temperature.

In variations of this heater system, which may be implemented individually or in any combination: the at least one heater unit is an end heater unit; the controller calculates temperature by supplying a known current to the plurality of heater units, measuring a voltage of the at least one independently controlled heating zone, and comparing the measured voltage to a nominal voltage associated with the known current to identify voltage deviations and/or corresponding resistance deviations; and the controller calculates temperature by supplying a known voltage to the plurality of heater units, measuring a current of the at least one independently controlled heating zone, and comparing the measured current to a nominal current associated with the known voltage to identify current deviations and/or corresponding resistance deviations. Further still, an apparatus having these variations of the heater system includes a sealed housing defining an internal chamber and having a fluid inlet and a fluid outlet. The heater assembly is disposed within the internal chamber of the housing and is adapted to provide a responsive heat distribution to a fluid within the housing.

In yet another form, a heater system includes a heater assembly comprising a plurality of heater units, more than one of the plurality of heater units defining at least one independently controlled heating zone. A plurality of power conductors are electrically connected to the heater units, and a power supply device includes a controller configured to modulate power to the independently controlled heating zones through the power conductors. The controller is configured to calculate temperature within the at more than one heater units based on a predefined model and at least one input, and the controller modulates power to the more than one heater units based on the calculated temperature.

In variations of this heater system, which may be implemented individually or in any combination: the at least one heater unit is an end heater unit; the controller calculates temperature by supplying a known current to the plurality of heater units, measuring a voltage of the at least one independently controlled heating zone, and comparing the measured voltage to a nominal voltage associated with the known current to identify voltage deviations and/or corresponding resistance deviations; and the controller calculates temperature by supplying a known voltage to the plurality of heater units, measuring a current of the at least one independently controlled heating zone, and comparing the measured current to a nominal current associated with the known voltage to identify current deviations and/or corresponding resistance deviations.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
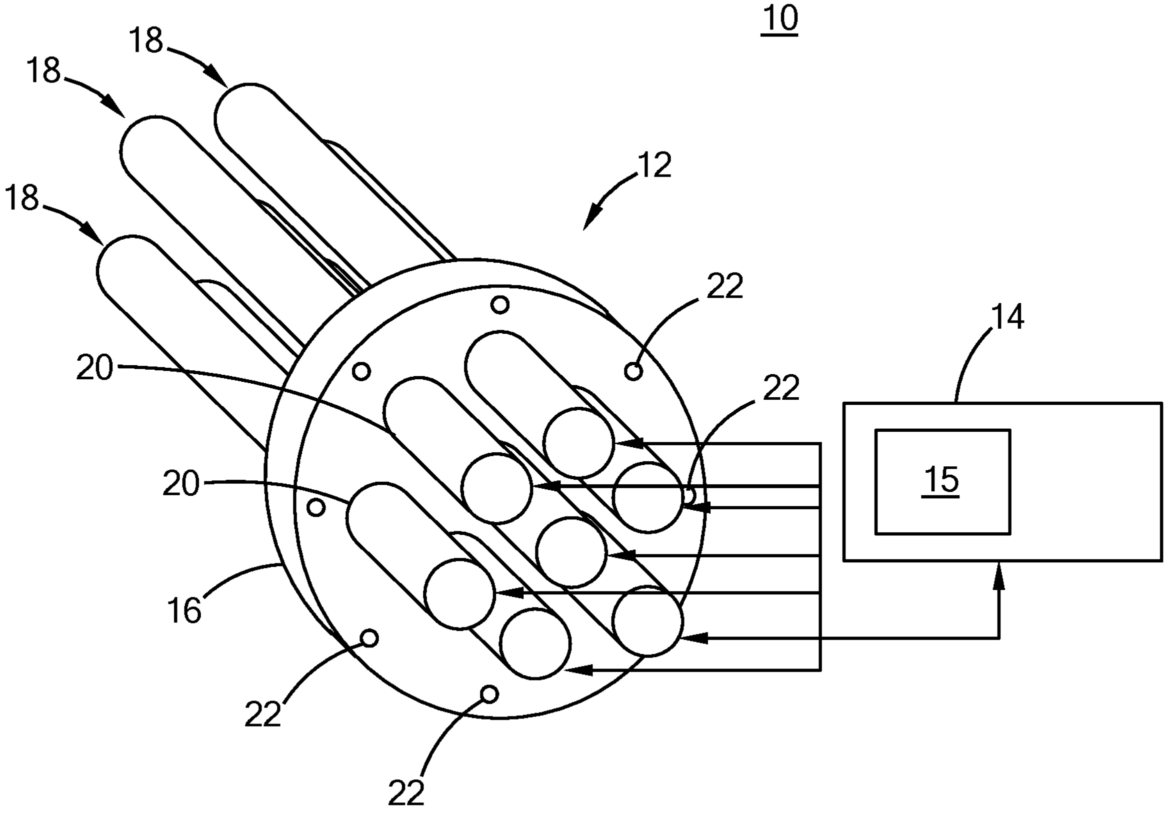
FIG. 1 is a perspective view of a heater bundle constructed in accordance with the teachings of the present disclosure.

Referring to FIG. 1, a heater system constructed in accordance with the teachings of the present disclosure is generally indicated by reference numeral 10. The heater system 10 includes a heater bundle 12 and a power supply device 14 electrically connected to the heater bundle 12. The power supply device 14 includes a controller 15 for controlling power supply to the heater bundle 12. A "heater bundle", as used in the present disclosure, refers to a heater apparatus including two or more physically distinct heating devices that can be independently controlled. Therefore, when one of the heating devices in the heater bundle fails or degrades, the remaining heating devices in the heater bundle 12 can continue to operate.

In one form, the heater bundle 12 includes a mounting flange 16 and a plurality of heater assemblies 18 secured to the mounting flange 16. The mounting flange 16 includes a plurality of apertures 20 through which the heater assemblies 18 extend. Although the heater assemblies 18 are arranged to be parallel in this form, it should be understood that alternate positions/arrangements of the heater assemblies 18 are within the scope of the present disclosure.

As further shown, the mounting flange 16 includes a plurality of mounting holes 22. By using screws or bolts (not shown) through the mounting holes 22, the mounting flange 16 may be assembled to a wall of a vessel or a pipe (not shown) that carries a fluid to be heated. At least a portion of the heater assemblies 18 are be immersed in the fluid inside the vessel or pipe to heat the fluid in this form of the present disclosure.

Figure 2:
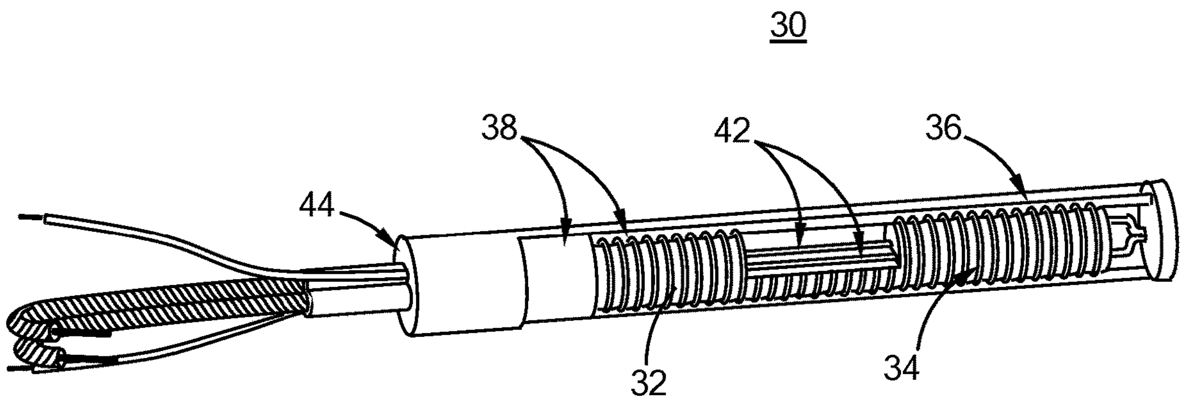
FIG. 2 is a perspective view of a heater assembly of the heater bundle of FIG. 1 in accordance with the teachings of the present disclosure.

Referring to FIG. 2, the heater assemblies 18 according to one form may be in the form of a cartridge heater 30. The cartridge heater 30 is a tube-shaped heater that generally includes a core body 32, a resistive heating wire 34 wrapped around the core body 32, a metal sheath 36 enclosing the core body 32 and the resistive heating wire 34 therein, and an insulating material 38 filling in the space in the metal sheath 36 to electrically insulate the resistive heating wire 34 from the metal sheath 36 and to thermally conduct the heat from the resistive heating wire 34 to the metal sheath 36. The core body 32 may be made of ceramic. The insulation material 38 may be compacted Magnesium Oxide (MgO). A plurality of power conductors 42 extend through the core body 32 along a longitudinal direction and are electrically connected to the resistive heating wires 34. The power conductors 42 also extend through an end piece 44 that seals the metal sheath 36. The power conductors 42 are connected to the power supply device 14 (shown in FIG. 1) to supply power from the power supply device 14 to the resistive heating wire 34. While FIG. 2 shows only two power conductors 42 extending through the end piece 44, more than two power conductors 42 can extend through the end piece 44. The power conductors 42 may be in the form of conductive pins. Various constructions and further structural and electrical details of cartridge heaters are set forth in greater detail in U.S. Pat. Nos. 2,831,951 and 3,970,822, which are commonly assigned with the present application and the contents of which are incorporated herein by reference in their entirety. Therefore, it should be understood that the form illustrated herein is merely exemplary and should not be construed as limiting the scope of the present disclosure.

Alternatively, multiple resistive heating wires 34 and multiple pairs of power conductors 42 may be used to form multiple heating circuits that can be independently controlled to enhance reliability of the cartridge heater 30. Therefore, when one of the resistive heating wires 34 fails, the remaining resistive heating wires 34 may continue to generate heat without causing the entire cartridge heater 30 to fail and without causing costly machine downtime.

Figure 3:
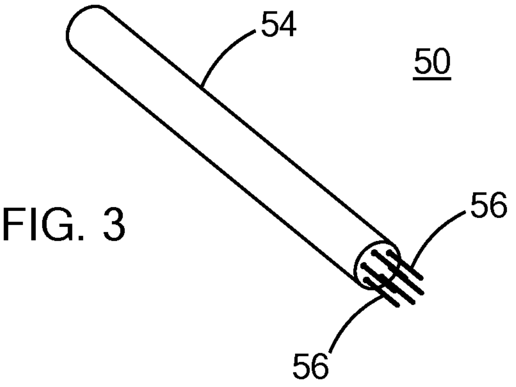
FIG. 3 is a perspective view of a variant of a heater assembly of the heater bundle of FIG. 1 in accordance with the teachings of the present disclosure.
Figure 4:
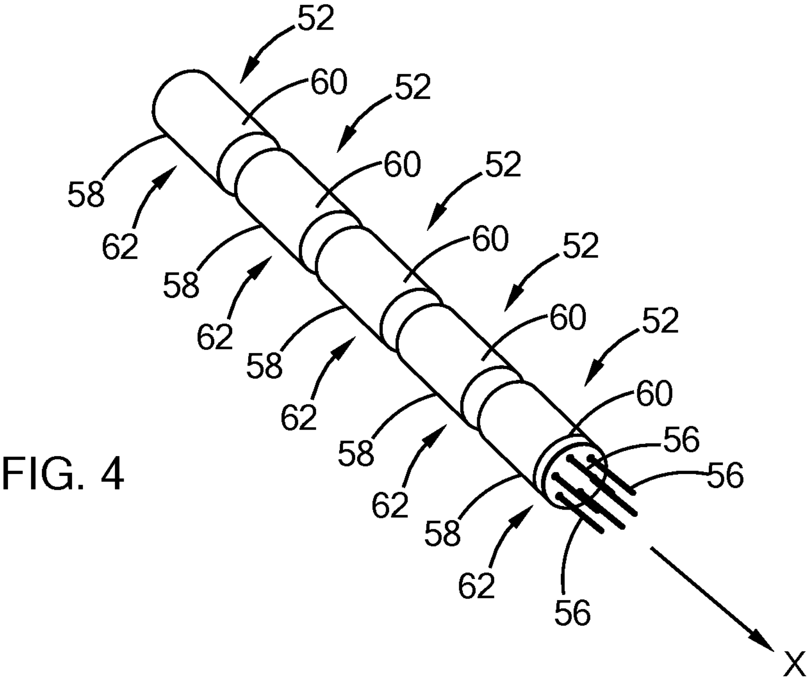
FIG. 4 is a perspective view of the heater assembly of FIG. 3 in accordance with the teachings of the present disclosure, wherein the outer sheath of the heater assembly is removed for clarity.
Figure 5:
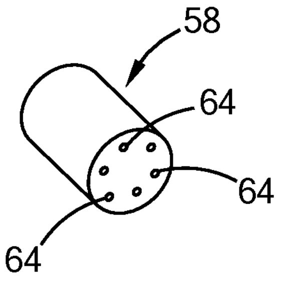
FIG. 5 is a perspective view of a core body of the heater assembly of FIG. 3 in accordance with the teachings of the present disclosure.

Referring to FIGS. 3 to 5, the heater assemblies 50 may be in the form of a cartridge heater having a configuration similar to that of FIG. 2 except for the number of core bodies and number of power conductors used. More specifically, the heater assemblies 50 each include a plurality of heater units 52, and an outer metal sheath 54 enclosing the plurality of heater units 52 therein, along with a plurality of power conductors 56. An insulating material (not shown in FIGS. 3 to 5) is provided between the plurality of heater units 52 and the outer metal sheath 54 to electrically insulate the heater units 52 from the outer metal sheath 54. The plurality of heater units 52 each include a core body 58 and a resistive heating element 60 surrounding the core body 58. The resistive heating element 60 of each heater unit 52 may define one or more heating circuits to define one or more heating zones 62.

In the present form, each heater unit 52 defines one heating zone 62 and the plurality of heater units 52 in each heater assembly 50 are aligned along a longitudinal direction X. Therefore, each heater assembly 50 defines a plurality of heating zones 62 aligned along the longitudinal direction X. The core body 58 of each heater unit 52 defines a plurality of through holes/apertures 64 to allow power conductors 56 to extend therethrough. The resistive heating elements 60 of the heater units 52 are connected to the power conductors 56, which, in turn, are connected to the power supply device 14. The power conductors 56 supply the power from the power supply device 14 to the plurality of heater units 52. By properly connecting the power conductors 56 to the resistive heating elements 60, the resistive heating elements 60 of the plurality of heater units 52 can be independently controlled by the controller 15 of the power supply device 14. As such, failure of one resistive heating element 60 for a particular heating zone 62 will not affect the proper functioning of the remaining resistive heating elements 60 for the remaining heating zones 62. Further, the heater units 52 and the heater assemblies 50 may be interchangeable for ease of repair or assembly.

In the present form, six power conductors 56 are used for each heater assembly 50 to supply power to five independent electrical heating circuits on the five heater units 52. Alternatively, six power conductors 56 may be connected to the resistive heating elements 60 in a way to define three fully independent circuits on the five heater units 52. It is possible to have any number of power conductors 56 to form any number of independently controlled heating circuits and independently controlled heating zones 62. For example, seven power conductors 56 may be used to provide six heating zones 62. Eight power conductors 56 may be used to provide seven heating zones 62.

The power conductors 56 may include a plurality of power supply and power return conductors, a plurality of power return conductors and a single power supply conductor, or a plurality of power supply conductors and a single power return conductor. If the number of heater zones is n, the number of power supply and return conductors is n+1.

Alternatively, a higher number of electrically distinct heating zones 62 may be created through multiplexing, polarity sensitive switching and other circuit topologies by the controller 15 of the power supply device 14. Use of multiplexing or various arrangements of thermal arrays to increase the number of heating zones within the cartridge heater 30 for a given number of power conductors (e.g. a cartridge heater with six power conductors for 15 or 30 zones.) is disclosed in U.S. Pat. Nos. 9,123,755, 9,123,756, 9,177,840, 9,196,513, and their related applications, which are commonly assigned with the present application and the contents of which are incorporated herein by reference in their entirety.

With this structure, each heater assembly 50 includes a plurality of heating zones 62 that can be independently controlled to vary the power output or heat distribution along the length of the heater assembly 50. The heater bundle 12 includes a plurality of such heater assemblies 50. Therefore, the heater bundle 12 provides a plurality of heating zones 62 and a tailored heat distribution for heating the fluid that flows through the heater bundle 12 to be adapted for specific applications. The power supply device 14 can be configured to modulate power to each of the independently controlled heating zones 62.

For example, a heater assembly 50 may define "m" heating zones, and the heater bundle may include "k" heating assemblies 50. Therefore, the heater bundle 12 may define m×k heating zones. The plurality of heating zones 62 in the heater bundle 12 can be individually and dynamically controlled in response to heating conditions and/or heating requirements, including but not limited to, the life and the reliability of the individual heater units 52, the sizes and costs of the heater units 52, local heater flux, characteristics and operation of the heater units 52, and the entire power output.

Each circuit is individually controlled at a desired temperature or a desired power level so that the distribution of temperature and/or power adapts to variations in system parameters (e.g. manufacturing variation/tolerances, changing environmental conditions, changing inlet flow conditions such as inlet temperature, inlet temperature distribution, flow velocity, velocity distribution, fluid composition, fluid heat capacity, etc.). More specifically, the heater units 52 may not generate the same heat output when operated under the same power level due to manufacturing variations as well as varied degrees of heater degradation over time. The heater units 52 may be independently controlled to adjust the heat output according to a desired heat distribution. The individual manufacturing tolerances of components of the heater system and assembly tolerances of the heater system are increased as a function of the modulated power of the power supply, or in other words, because of the high fidelity of heater control, manufacturing tolerance of individual components need not be as tight/narrow.

The heater units 52 may each include a temperature sensor (not shown) for measuring the temperature of the heater units 52. When a hot spot in the heater units 52 is detected, the power supply device 14 may reduce or turn off the power to the particular heater unit 52 on which the hot spot is detected to avoid overheating or failure of the particular heater unit 52. The power supply device 14 may modulate the power to the heater units 52 adjacent to the disabled heater unit 52 to compensate for the reduced heat output from the particular heater unit 52.

The power supply device 14 may include multi-zone algorithms to turn off or turn down the power level delivered to any particular zone, and to increase the power to the heating zones adjacent to the particular heating zone that is disabled and has a reduced heat output. By carefully modulating the power to each heating zone, the overall reliability of the system can be improved. By detecting the hot spot and controlling the power supply accordingly, the heater system 10 has improved safety.

The heater bundle 12 with the multiple independently controlled heating zones 62 can accomplish improved heating. For example, some circuits on the heater units 52 may be operated at a nominal (or "typical") duty cycle of less than 100% (or at an average power level that is a fraction of the power that would be produced by the heater with line voltage applied). The lower duty cycles allow for the use of resistive heating wires with a larger diameter, thereby improving reliability.

Normally, smaller zones would employ a finer wire size to achieve a given resistance. Variable power control allows a larger wire size to be used, and a lower resistance value can be accommodated, while protecting the heater from overloading with a duty cycle limit tied to the power dissipation capacity of the heater.

The use of a scaling factor may be tied to the capacity of the heater units 52 or the heating zone 62. The multiple heating zones 62 allow for more accurate determination and control of the heater bundle 12. The use of a specific scaling factor for a particular heating circuit/zone will allow for a more aggressive (i.e. higher) temperature (or power level) at almost all zones, which, in turn, lead to a smaller, less costly design for the heater bundle 12. Such a scaling factor and method is disclosed in U.S. Pat. No. 7,257,464, which is commonly assigned with the present application and the contents of which are incorporated herein by reference in its entirety.

The sizes of the heating zones controlled by the individual circuits can be made equal or different to reduce the total number of zones needed to control the distribution of temperature or power to a desired accuracy.

Referring back to FIG. 1, the heater assemblies 18 are shown to be a single end heater, i.e., the conductive pin extends through only one longitudinal end of the heater assemblies 18. The heater assembly 18 may extend through the mounting flange 16 or a bulkhead (not shown) and sealed to the flange 16 or bulkhead. As such, the heater assemblies 18 can be individually removed and replaced without removing the mounting flange 16 from the vessel or tube.

Alternatively, the heater assembly 18 may be a "double ended" heater. In a double-ended heater, the metal sheath is bent into a hairpin shape and the power conductors pass through both longitudinal ends of the metal sheath so that both longitudinal ends of the metal sheath pass through and are sealed to the flange or bulkhead. In this structure, the flange or the bulkhead need to be removed from the housing or the vessel before the individual heater assembly 18 can be replaced.

Figure 6:
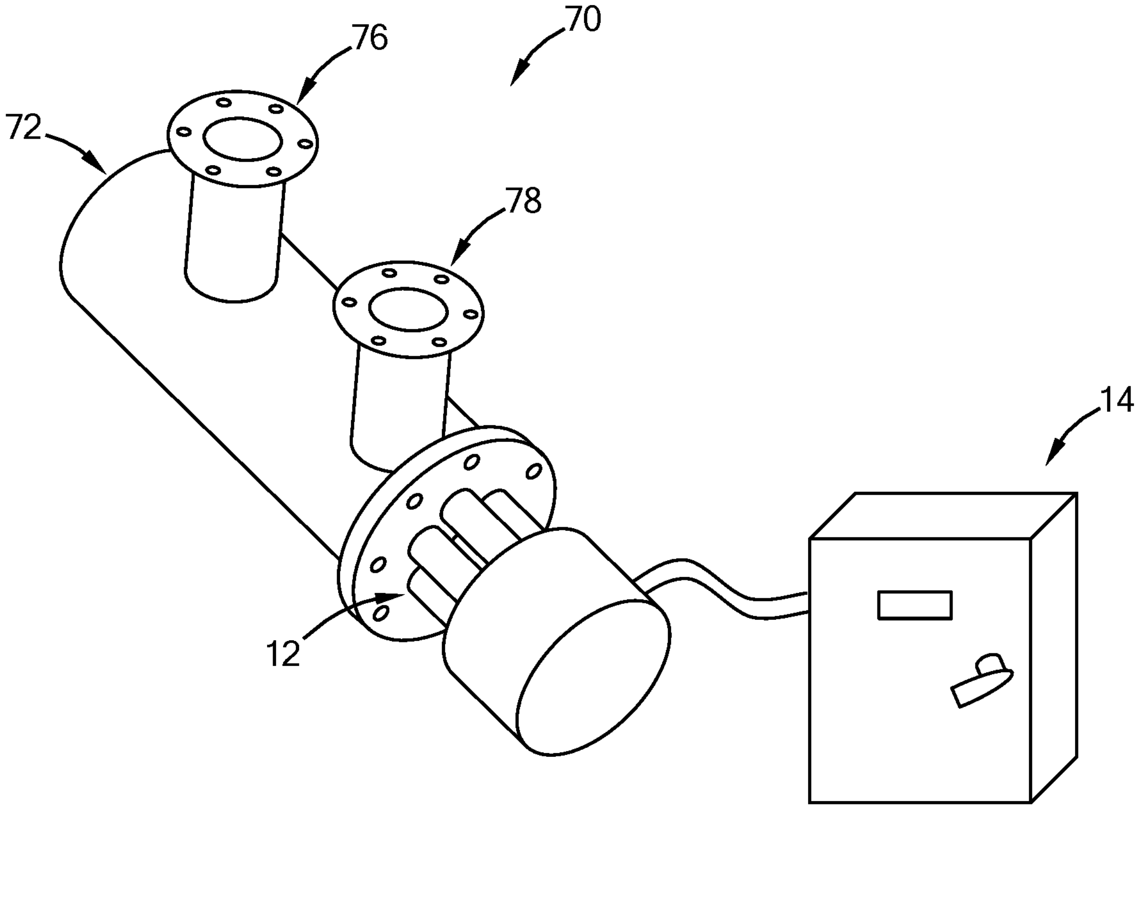
FIG. 6 is a perspective view of a heat exchanger including the heater bundle of FIG. 1 in accordance with the teachings of the present disclosure, wherein the heater bundle is partially disassembled from the heat exchanger to expose the heater bundle for illustration purposes.

Referring to FIG. 6, a heater bundle 12 is incorporated in a heat exchanger 70. The heat exchanger 70 includes a sealed housing 72 defining an internal chamber (not shown), a heater bundle 12 disposed within the internal chamber of the housing 72. The sealed housing 72 includes a fluid inlet 76 and a fluid outlet 78 through which fluid is directed into and out of the internal chamber of the sealed housing 72. The fluid is heated by the heater bundle 12 disposed in the sealed housing 72. The heater bundle 12 may be arranged for either cross-flow or for flow parallel to their length.

The heater bundle 12 is connected to the power supply device 14 which may include a means to modulate power, such as a switching means or a variable transformer, to modulate the power supplied to an individual zone. The power modulation may be performed as a function of time or based on detected temperature of each heating zone.

The resistive heating wire may also function as a sensor using the resistance of the resistive wire to measure the temperature of the resistive wire and using the same power conductors to send temperature measurement information to the power supply device 14. A means of sensing temperature for each zone would allow the control of temperature along the length of each heater assembly 18 in the heater bundle 12 (down to the resolution of the individual zone). Therefore, the additional temperature sensing circuits and sensing means can be dispensed with, thereby reducing the manufacturing costs. Direct measurement of the heater circuit temperature is a distinct advantage when trying to maximize heat flux in a given circuit while maintaining a desired reliability level for the system because it eliminates or minimizes many of the measurement errors associated with using a separate sensor. The heating element temperature is the characteristic that has the strongest influence on heater reliability. Using a resistive element to function as both a heater and a sensor is disclosed in U.S. Pat. No. 7,196,295, which is commonly assigned with the present application and the contents of which are incorporated herein by reference in its entirety.

Alternatively, the power conductors 56 may be made of dissimilar metals such that the power conductors 56 of dissimilar metals may create a thermocouple for measuring the temperature of the resistive heating elements. For example, at least one set of a power supply and a power return conductor may include different materials such that a junction is formed between the different materials and a resistive heating element of a heater unit and is used to determine temperature of one or more zones. Use of "integrated" and "highly thermally coupled" sensing, such as using different metals for the heater leads to generation of a thermocouple-like signal. The use of the integrated and coupled power conductors for temperature measurement is disclosed in U.S. application Ser. No. 14/725,537, which is commonly assigned with the present application and the contents of which are incorporated herein by reference in its entirety.

The controller 15 for modulating the electrical power delivered to each zone may be a closed-loop automatic control system. The closed-loop automatic control system receives the temperature feedback from each zone and automatically and dynamically controls the delivery of power to each zone, thereby automatically and dynamically controlling the power distribution and temperature along the length of each heater assembly 18 in the heater bundle 12 without continuous or frequent human monitoring and adjustment.

The heater units 52 as disclosed herein may also be calibrated using a variety of methods including, but not limited to, energizing and sampling each heater unit 52 to calculate its resistance. The calculated resistance can then be compared to a calibrated resistance to determine a resistance ratio, or a value to then determine actual heater unit temperatures. Exemplary methods are disclosed in U.S. Pat. Nos. 5,280,422 and 5,552,998, which are commonly assigned with the present application and the contents of which are incorporated herein by reference in their entirety.

One form of calibration includes operating the heater system 10 in at least one mode of operation, controlling the heater system 10 to generate a desired temperature for at least one of the independently controlled heating zones 62, collecting and recording data for the at least one independently controlled heating zones 62 for the mode of operation, then accessing the recorded data to determine operating specifications for a heating system having a reduced number of independently controlled heating zones, and then using the heating system with the reduced number of independently controlled heating zones. The data may include, by way of example, power levels and/or temperature information, among other operational data from the heater system 10 having its data collected and recorded.

In a variation of the present disclosure, the heater system may include a single heater assembly 18, rather than a plurality of heater assemblies in a heater bundle 12. The single heater assembly 18 would comprise a plurality of heater units 52, each heater unit 52 defining at least one independently controlled heating zone. Similarly, power conductors 56 are electrically connected to each of the independently controlled heating zones 62 in each of the heater units 52, and the power supply device is configured to modulate power to each of the independently controlled heating zones 62 of the heater units through the power conductors 56.

Figure 7:
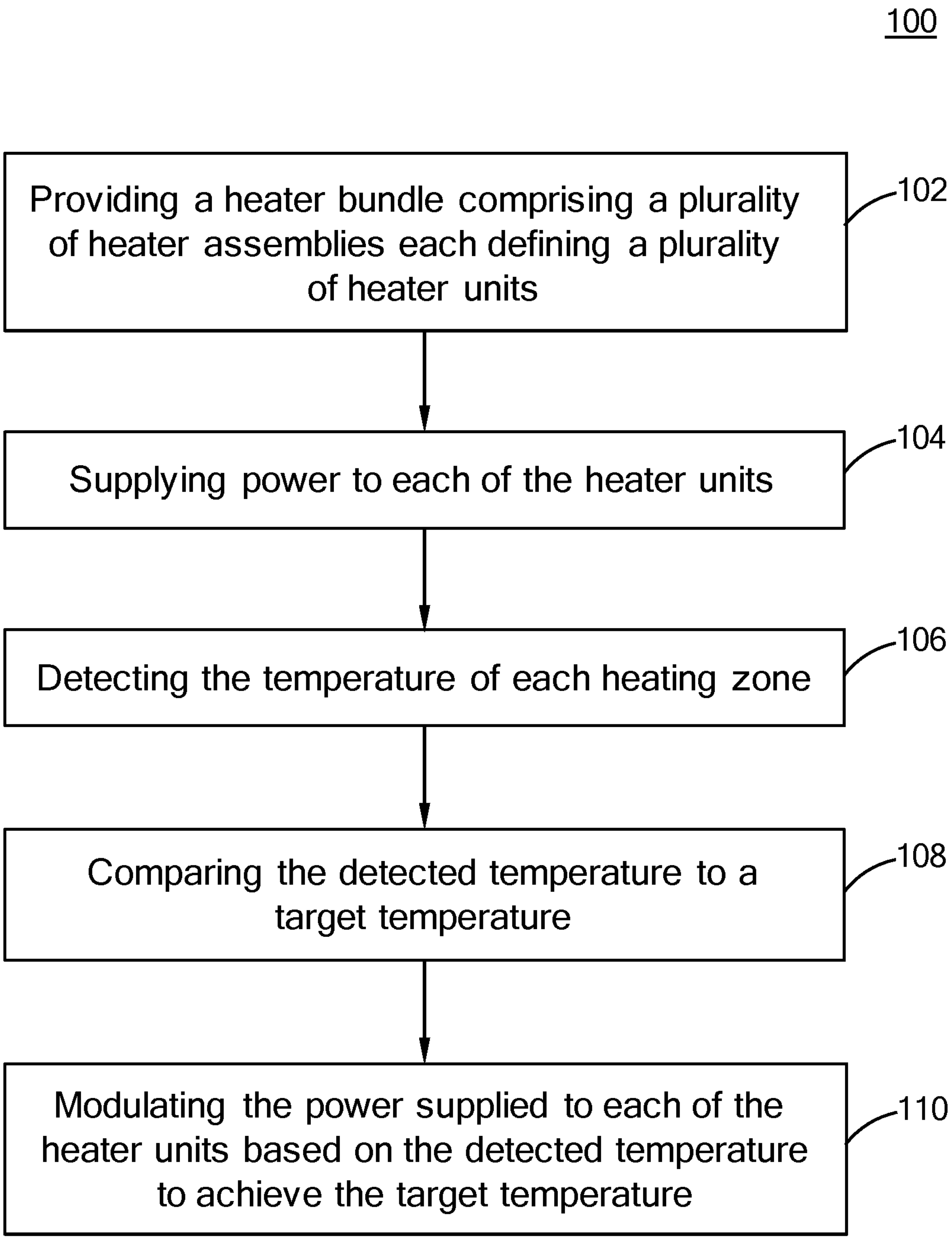
FIG. 7 is a block diagram of a method of operating a heater system including a heater bundle constructed in accordance with the teachings of the present disclosure.

Referring to FIG. 7, a method 100 of controlling a heater system includes providing a heater bundle comprising a plurality of heater assemblies in step 102. Each heater assembly includes a plurality of heater units. Each heater unit defines at least one independently controlled heating circuit (and consequently heating zone). The power to each of the heater units is supplied through power conductors electrically connected to each of the independently controlled heating zones in each of the heater units in step 104. The temperature within each of the zones is detected in step 106. The temperature may be determined using a change in resistance of a resistive heating element of at least one of the heater units. The zone temperature may be initially determined by measuring the zone resistance (or, by measurement of circuit voltage, if appropriate materials are used).

The temperature values may be digitalized. The signals may be communicated to a microprocessor. The measured (detected) temperature values may be compared to a target (desired) temperature for each zone in step 108. The power supplied to each of the heater units may be modulated based on the measured temperature to achieve the target temperatures in step 110.

Optionally, the method may further include using a scaling factor to adjust the modulating power. The scaling factor may be a function of a heating capacity of each heating zone. The controller 15 may include an algorithm, potentially including a scaling factor and/or a mathematical model of the dynamic behavior of the system (including knowledge of the update time of the system), to determine the amount of power to be provided (via duty cycle, phase angle firing, voltage modulation or similar techniques) to each zone until the next update. The desired power may be converted to a signal, which is sent to a switch or other power modulating device for controlling power output to the individual heating zones.

In the present form, when at least one heating zone is turned off due to an anomalous condition, the remaining zones continue to provide a desired wattage without failure. Power is modulated to a functional heating zone to provide a desired wattage when an anomalous condition is detected in at least one heating zone. When at least one heating zone is turned off based on the determined temperature, the remaining zones continue to provide a desired wattage. The power is modulated to each of the heating zones as a function of at least one of received signals, a model, and as a function of time.

For safety or process control reasons, typical heaters are generally operated to be below a maximum allowable temperature in order to prevent a particular location of the heater from exceeding a given temperature due to unwanted chemical or physical reactions at the particular location, such as combustion/fire/oxidation, coking boiling etc.). Therefore, this is normally accommodated by a conservative heater design (e.g., large heaters with low power density and much of their surface area loaded with a much lower heat flux than might otherwise be possible).

However, with the heater bundle of the present disclosure, it is possible to measure and limit the temperature of any location within the heater down to a resolution on the order of the size of the individual heating zones. A hot spot large enough to influence the temperature of an individual circuit can be detected.

Since the temperature of the individual heating zones can be automatically adjusted and consequently limited, the dynamic and automatic limitation of temperature in each zone will maintain this zone and all other zones to be operating at an optimum power/heat flux level without fear of exceeding the desired temperature limit in any zone. This brings an advantage in high-limit temperature measurement accuracy over the current practice of clamping a separate thermocouple to the sheath of one of the elements in a bundle. The reduced margin and the ability to modulate the power to individual zones can be selectively applied to the heating zones, selectively and individually, rather than applied to an entire heater assembly, thereby reducing the risk of exceeding a predetermined temperature limit.

The characteristics of the cartridge heater may vary with time. This time varying characteristic would otherwise require that the cartridge heater be designed for a single selected (worse-case) flow regime and therefore, the cartridge heater would operate at a sub-optimum state for other states of flow.

However, with dynamic control of the power distribution over the entire bundle down to a resolution of the core size due to the multiple heating units provided in the heater assembly, an optimized power distribution for various states of flow can be achieved, as opposed to only one power distribution corresponding to only one flow state in the typical cartridge heater. Therefore, the heater bundle of the present application allows for an increase in the total heat flux for all other states of flow.

Further, variable power control can increase heater design flexibility. The voltage can be de-coupled from resistance (to a great degree) in heater design and the heaters may be designed with the maximum wire diameter that can be fitted into the heater. It allows for increased capacity for power dissipation for a given heater size and level of reliability (or life of the heater) and allows for the size of the bundle to be decreased for a given overall power level. Power in this arrangement can be modulated by a variable duty cycle that is a part of the variable wattage controllers currently available or under development. The heater bundle can be protected by a programmable (or pre-programmed if desired) limit to the duty cycle for a given zone to prevent "overloading" the heater bundle.

Figure 8:
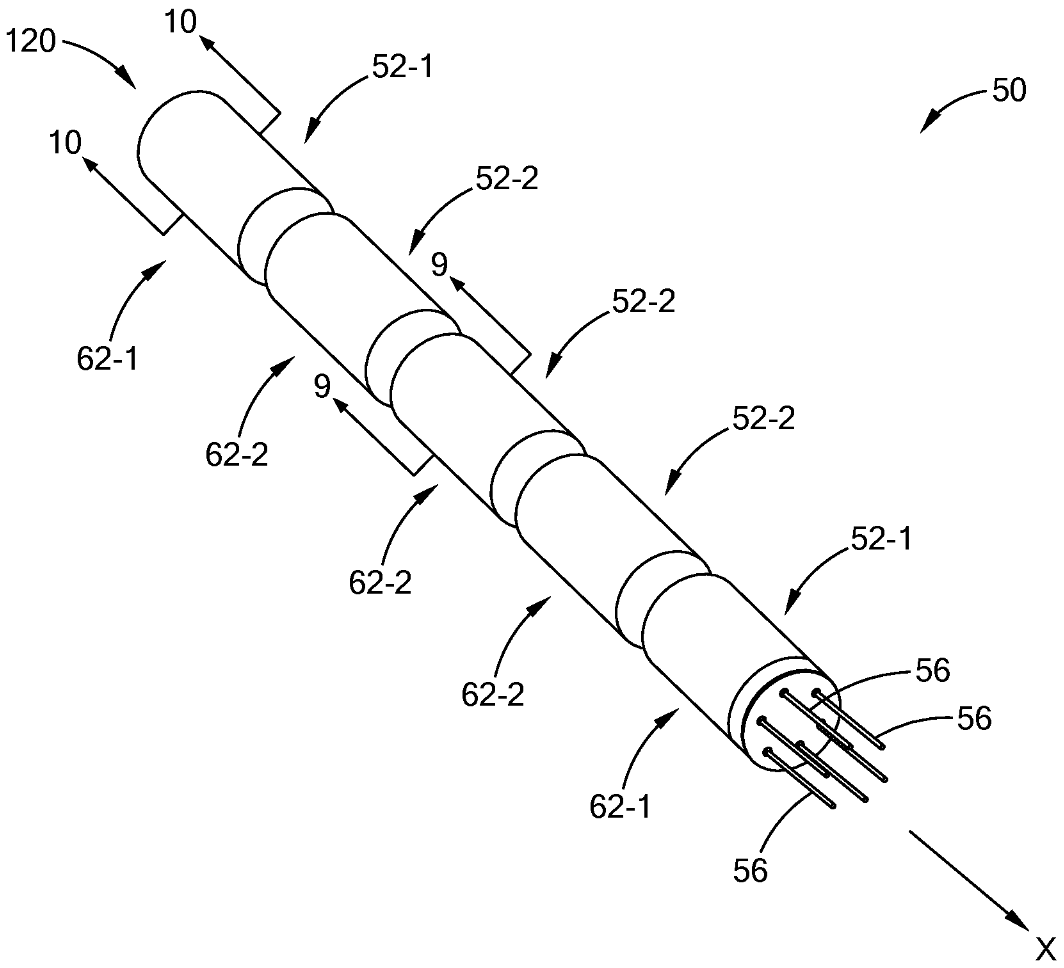
FIG. 8 is a perspective view of the heater assembly including a thermal provision in accordance with the teachings of the present disclosure.

With reference to FIG. 8, a perspective view of the heater assembly 50 with a thermal provision is shown. Generally, the thermal provision is configured to modify a thermal conductance along a length of the at least one heater assembly to compensate for non-uniform temperatures within at least one heater unit. This thermal provision may take on a variety of forms as set forth in greater detail below.

Figure 9:
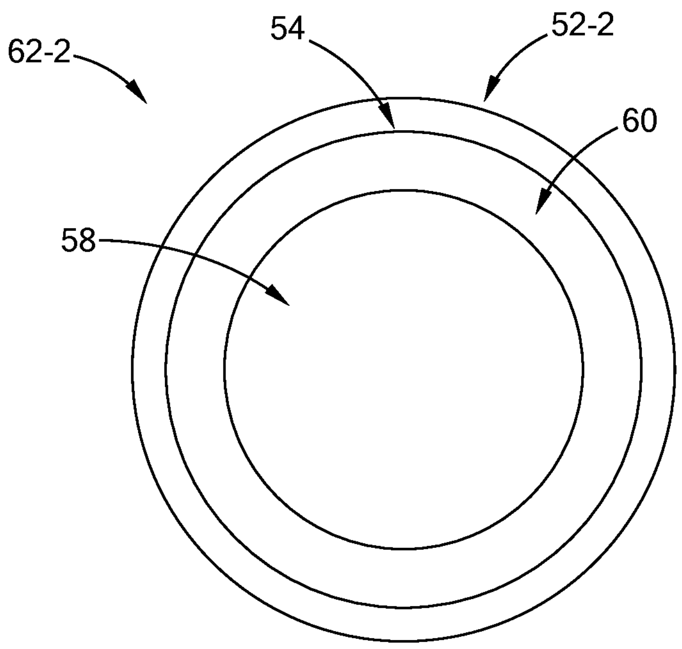
FIG. 9 is a cross-sectional view of the heater assembly along line 9-9 of FIG. 8 in accordance with the teachings of the present disclosure.
Figure 10:
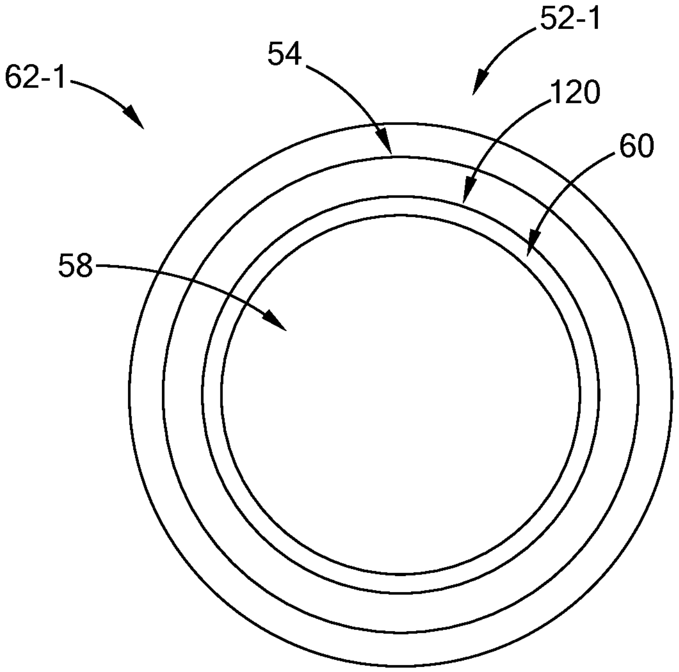
FIG. 10 is a cross-sectional view of the heater assembly along line 10-10 of FIG. 8 in accordance with the teachings of the present disclosure.

As described above, the heater assemblies 50 each include a plurality of heater units 52. Each heater unit 52 defines one of an end heater unit 52-1 and adjacent heater units 52-2. As shown in FIGS. 9-10, each of the end heater units 52-1 and the adjacent heater units 52-2 include a core body 58 and a resistive heating element 60 surrounding the core body 58. The resistive heating element 60 of each end heater unit 52-1 defines one or more end heating zones 62-1, and the resistive heating element 60 of each adjacent heater unit 52-2 defines one or more adjacent heating zones 62-2.

The resistive heating elements 60 of the end heater units 52-1 and the adjacent heater units 52-2 are connected to the power conductors 56, which, in turn, are connected to the power supply device 14. The power conductors 56 supply the power from the power supply device 14 to the end heater units 52-1 and the adjacent heater units 52-2. By selectively connecting the power conductors 56 to the resistive heating elements 60, the resistive heating elements 60 of the end heater units 52-1 and the adjacent heater units 52-2 can be independently controlled by the controller 15 of the power supply device 14.

In one form, the thermal provision of the heater assembly 50 is implemented by a conductive sleeve 120. As an example, and with reference to FIG. 10, the conductive sleeve 120 is disposed proximate to the resistive heating element 60 of the end heater unit 52-1. In one form, the conductive sleeve 120 surrounds the resistive heating element 60 and the core body 58, and the conductive sleeve 120 is disposed between the outer metal sheath 54 and the resistive heating element 60. It should be understood that the conductive sleeve 120 may not entirely surround the resistive heating element 60 and the core body 58 in other forms. It should also be understood that the conductive sleeve 120 may not be disposed between the outer metal sheath 54 and the resistive heating element 60 in other forms.

In one form, the conductive sleeve 120 has a thermal conductivity that is greater than a thermal conductivity of the outer metal sheath 54. Accordingly, the conductive sleeve 120 is configured to increase the conductance of the end heater unit 52-1 relative to the adjacent heater units 52-2 and thereby inhibit undesirable temperature gradients along the heater assembly 50.

Figure 11:
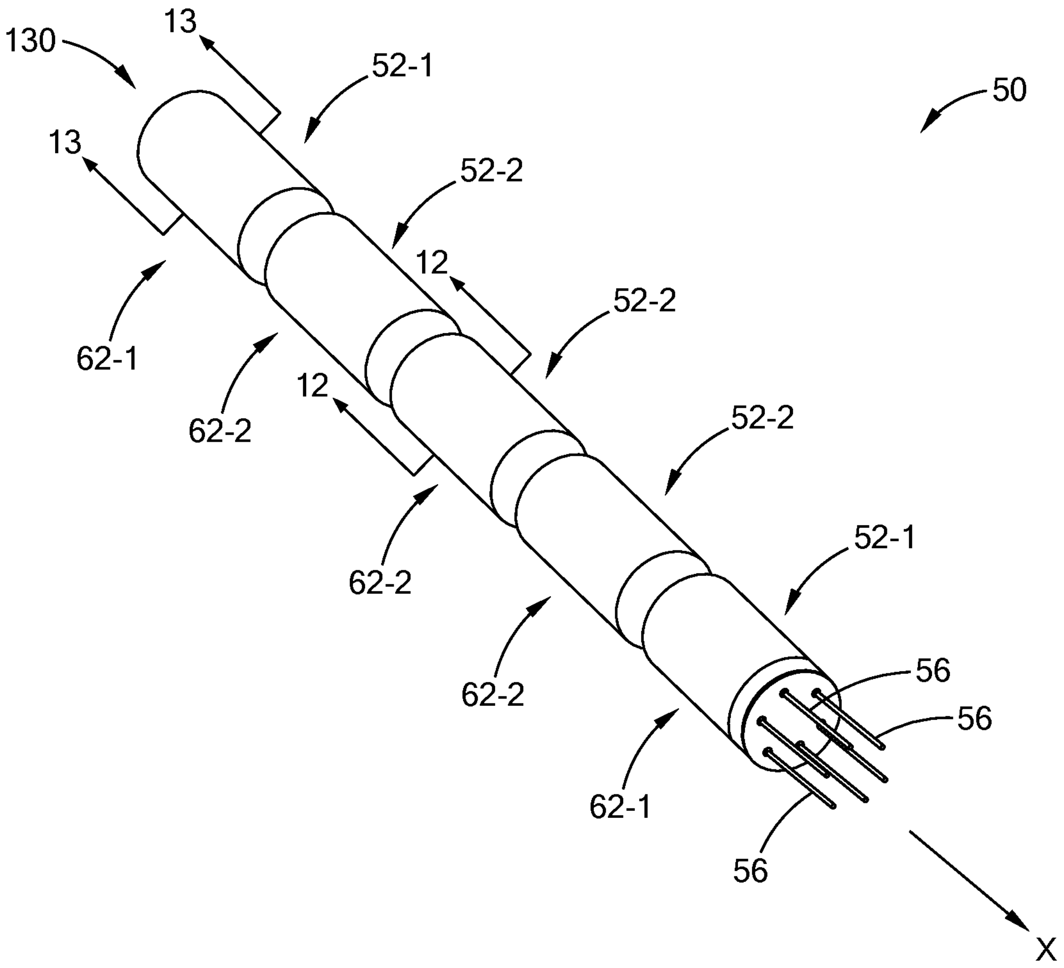
FIG. 11 is a perspective view of the heater assembly including another thermal provision in accordance with the teachings of the present disclosure.
Figure 12:
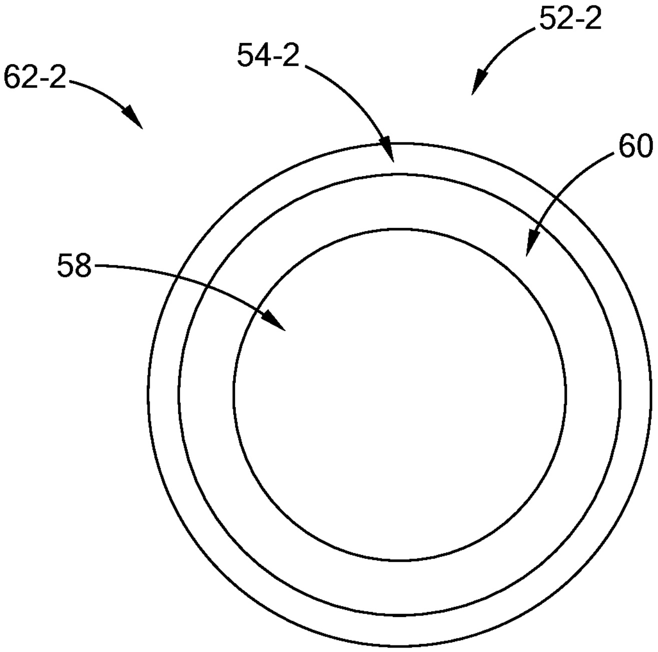
FIG. 12 is a cross-sectional view of the heater assembly along line 12-12 of FIG. 11 in accordance with the teachings of the present disclosure.
Figure 13:
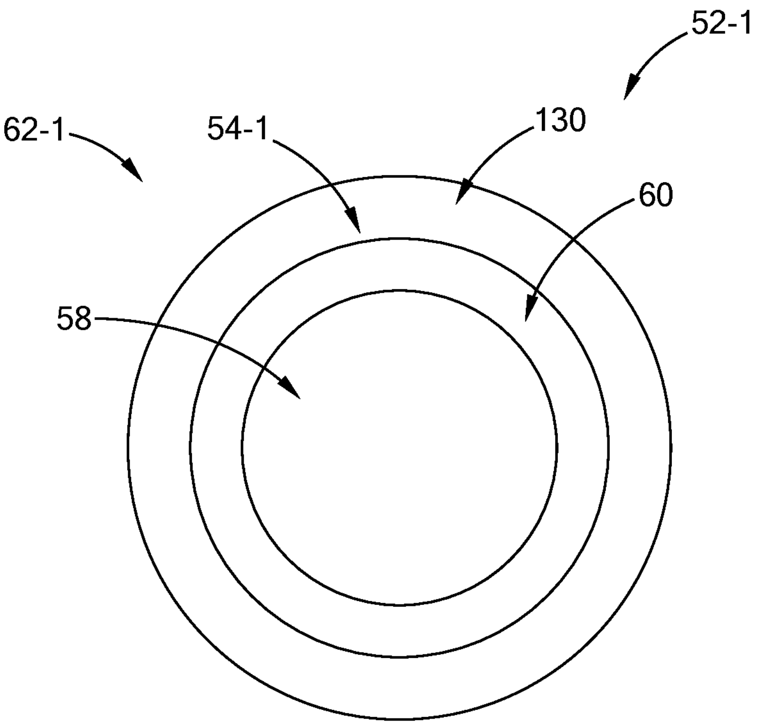
FIG. 13 is a cross-sectional view of the heater assembly along line 13-13 of FIG. 11 in accordance with the teachings of the present disclosure.

With reference to FIG. 11, a perspective view of the heater assembly 50 with another example thermal provision is shown. In one form, the thermal provision of the heater assembly 50 is implemented by outer sheath thermal provision 130. More particularly and with reference to FIGS. 12-13, the heater assembly 50 includes end outer metal sheaths 54-1 and adjacent outer metal sheaths 54-2, respectively. The end outer metal sheaths 54-1 and the adjacent outer metal sheaths 54-2 collectively form the outer metal sheath 54, and the outer sheath thermal provision 130 is implemented by the end outer end metal sheaths 54-2.

In one form, the end outer metal sheaths 54-1 and the adjacent outer metal sheaths 54-2 have different thicknesses and/or thermal conductivities. As an example, the end outer metal sheaths 54-1 have a greater thickness and a higher thermal conductivity relative to the adjacent outer metal sheaths 54-2. Accordingly, the end outer metal sheaths 54-1 are configured to increase the conductance of the end heater unit 52-1 relative to the adjacent heater units 52-2 and thereby, inhibit undesirable temperature gradients along the heater assembly 50. It should be understood that the end outer metal sheaths 54-1 and the adjacent outer metal sheaths 54-2 can have varying thicknesses and/or thermal conductivities in other variations to selectively control the thermal gradients along the heater assembly 50.

Figure 14:
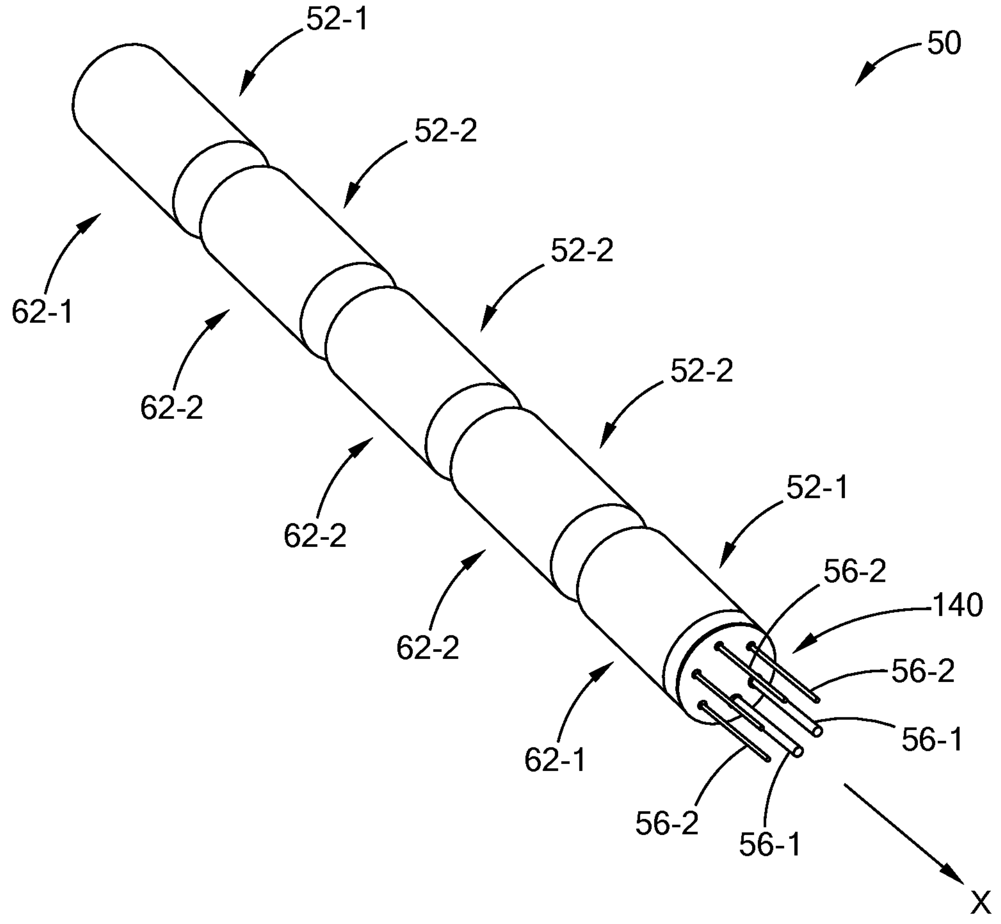
FIG. 14 is a perspective view of the heater assembly including another thermal provision in accordance with the teachings of the present disclosure.

With reference to FIG. 14, perspective view of the heater assembly 50 with another example thermal provision is shown. In this form, the thermal provision of the heater assembly 50 is implemented by power conductor thermal provision 140. The power conductor thermal provision 140 is implemented by end power conductors 56-1 and adjacent power conductors 56-2. In one form, the end power conductors 56-1 and the adjacent power conductors 56-2 collectively form the plurality of power conductors 56. The end power conductors 56-1 are connected to the resistive heating elements 60 of the end heater units 52-1, and the adjacent power conductors 56-2 are connected to the resistive heating elements 60 of the adjacent heater units 52-2.

Figure 15:
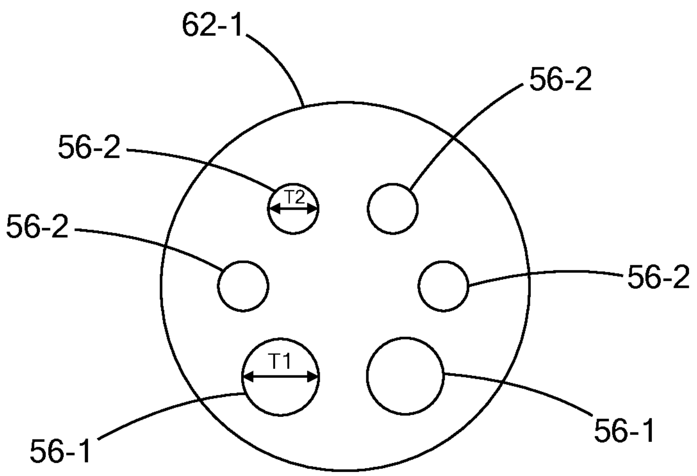
FIG. 15 is a side view of the thermal provision of the heater assembly of FIG. 14 in accordance with the teachings of the present disclosure.

In some forms and with reference to FIGS. 14-15, the end power conductors 56-1 and the adjacent power conductors 56-2 have different thicknesses, cross-sectional areas, and/or thermal conductivities. As an example, the end power conductors 56-1 have a greater thickness ($T_1$) and cross-sectional area (which is proportional to the thickness $T_1$ in this form) than the thickness ($T_2$) and cross-sectional area of the adjacent power conductors 56-2 (which is proportional to the thickness $T_2$ in this form). Accordingly, the end power conductors 56-1 are configured to increase the conductance of the end heater unit 52-1 relative to the adjacent heater units 52-2 and thereby, inhibit undesirable temperature gradients along the heater assembly 50. It should be understood that the end power conductors 56-1 and the adjacent power conductors 56-2 can have varying thicknesses, cross-sectional areas, and/or thermal conductivities in other forms to selectively control the thermal gradients along the heater assembly 50.

Figure 16:
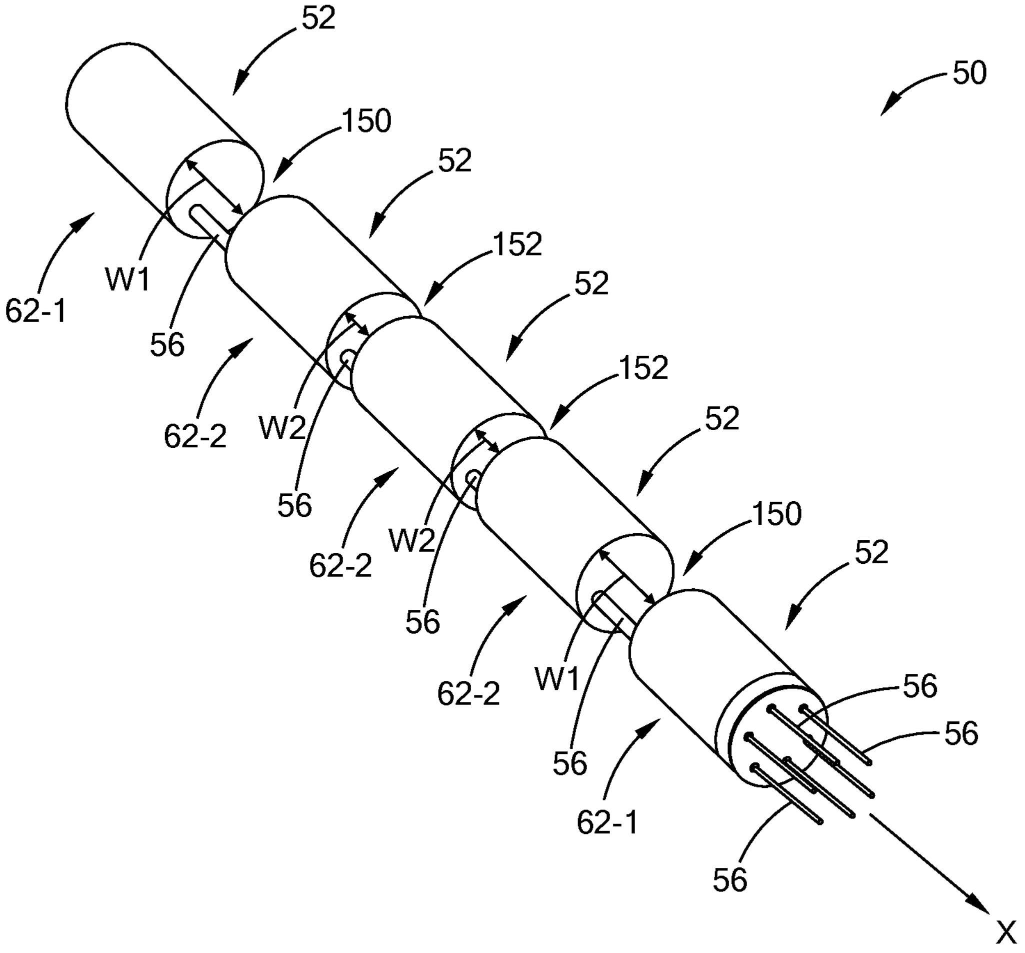
FIG. 16 is a perspective view of the heater assembly including a thermal provision in accordance with the teachings of the present disclosure.

With reference to FIG. 16, a perspective view of the heater assembly 50 with another example thermal provision is shown. In one form, the heater assembly 50 includes end spacings 150 and adjacent spacings 152, and the thermal provision of the heater assembly 50 is defined by the end spacings 150. As used herein, "spacing" refers to a gap between consecutive heater units 52. As an example, the end spacings 150 refer to the gaps between the end heater units 52-1 and an adjacent heater unit 52-2, and the adjacent spacings 152 refer to the gaps between adjacent heater units 52-2. In one form, a width of the end spacings 150 ($W_1$) in the longitudinal direction X is greater than a width of the adjacent spacings 152 ($W_2$) in the longitudinal direction X.

While the width of the end spacings 150 ($W_1$) illustrated in FIG. 16 are equal, it should be understood that the width of the end spacings 150 ($W_1$) can be unequal in other forms. Likewise, while the width of the adjacent spacings 152 ($W_2$) illustrated in FIG. 15 are equal, it should be understood that the width of the adjacent spacings 152 ($W_2$) can be unequal in other forms. In one form, the width of the end spacings 150 ($W_1$) is less than or equal to a width of the adjacent spacings 152 ($W_2$). By selectively designating the width of the end spacings 150 ($W_1$) and the width of the adjacent spacings 152 ($W_2$), the conductance of the end heater units 52-1 relative to the adjacent heater units 52-2 can be increased to inhibit undesirable temperature gradients along the heater assembly 50.

Figure 17:
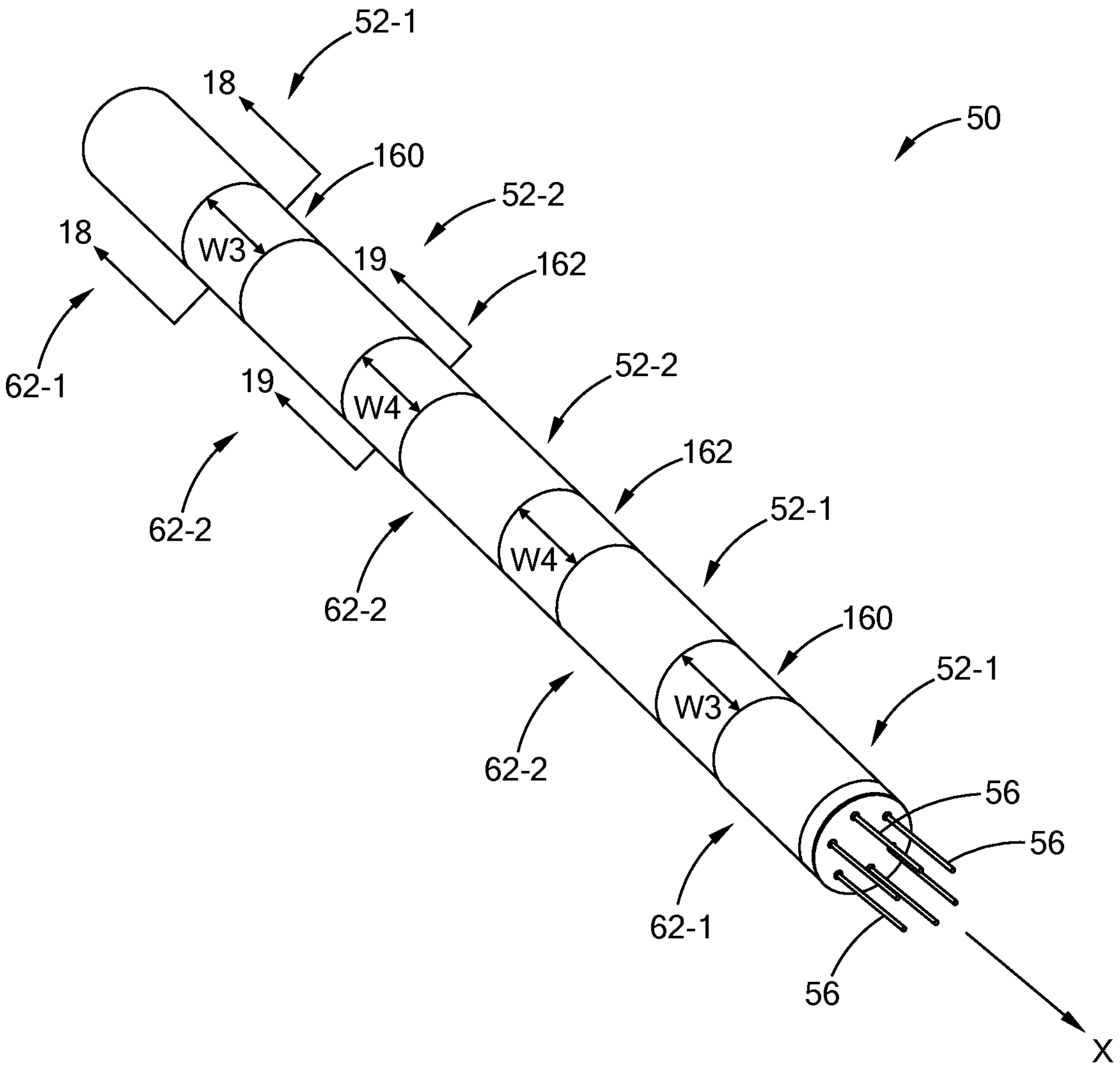
FIG. 17 is a perspective view of the heater assembly including a thermal provision in accordance with the teachings of the present disclosure.

With reference to FIG. 17, a perspective view of the heater assembly 50 with another example thermal provision is shown. In some forms, the heater assembly 50 includes end spacers 160 and adjacent spacers 162, and the thermal provision of the heater assembly 50 is implemented by the end spacers 160. The end spacers 160 are disposed between the end heater units 52-1 and an adjacent heater unit 52-2, and the adjacent spacers 162 are disposed between adjacent heater units 52-2. The end spacers 160 and the adjacent spacers 162 may be implemented by various materials having lower thermal conductivities, such as a ceramic material (e.g., aluminum nitride, boron nitride, polyurethane, and a glass-based material, such as borosilicate glass, acrylic glass, fiberglass, among others).

In some forms, a width of the end spacers 160 ($W_3$) in the longitudinal direction X is greater than a width of the adjacent spacers 162 ($W_4$) in the longitudinal direction X. While the width of the end spacers 160 ($W_3$) illustrated in FIG. 17 are equal, it should be understood that the width of the end spacers 160 ($W_3$) can be unequal in other forms. Likewise, while the width of the adjacent spacers 162 ($W_4$) illustrated in FIG. 15 are equal, it should be understood that the width of the adjacent spacers 162 ($W_4$) can be unequal in other forms. In one form, the width of the end spacers 160 ($W_3$) is less than or equal to a width of the adjacent spacers 162 ($W_4$). By selectively designating the width of the end spacers 160 ($W_3$) and the width of the adjacent spacers 162 ($W_4$), the conductance of the end heater units 52-1 relative to the adjacent heater units 52-2 can be increased to inhibit undesirable temperature gradients along the heater assembly 50.

Figure 18:
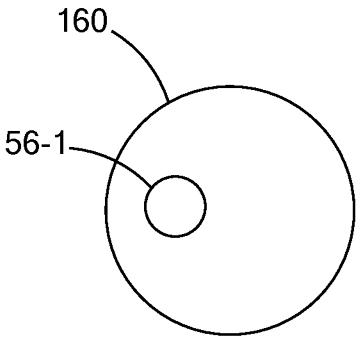
FIG. 18 is a cross-sectional view of the heater assembly along line 18-18 of FIG. 17 in accordance with the teachings of the present disclosure.
Figure 19:
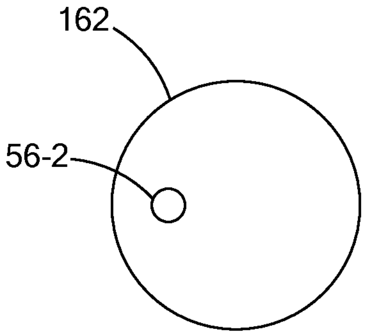
FIG. 19 is a cross-sectional view of the heater assembly along line 19-19 of FIG. 17 in accordance with the teachings of the present disclosure.

In one form, the power conductor thermal provision 140 described above with reference to FIGS. 14-15 and the end spacers 160 are combined to collectively form a thermal provision. As an example and as shown in FIGS. 18-19, the end power conductors 56-1 extend along the heater assembly 50 in the longitudinal direction X such that the end power conductors 56-1 are disposed within a corresponding end spacer 160 and within the corresponding end heater unit 52-1 (not shown). Likewise, the adjacent power conductors 56-2 extend along the heater assembly 50 in the longitudinal direction X such that the adjacent power conductors 56-2 are disposed within a corresponding adjacent spacer 162 and within the corresponding adjacent heater unit 52-2 (not shown). In some forms, the end power conductors 56-1 disposed within the end spacer 160 have a greater cross-sectional area than the adjacent power conductors 56-2 disposed within the adjacent spacers 162. It should be understood that the end power conductors 56-1 disposed within the end spacer 160 may have a cross-sectional area that is less than or equal to the cross-sectional area of the adjacent power conductors 56-2 disposed within the adjacent spacers 162 in other forms.

Figure 20:
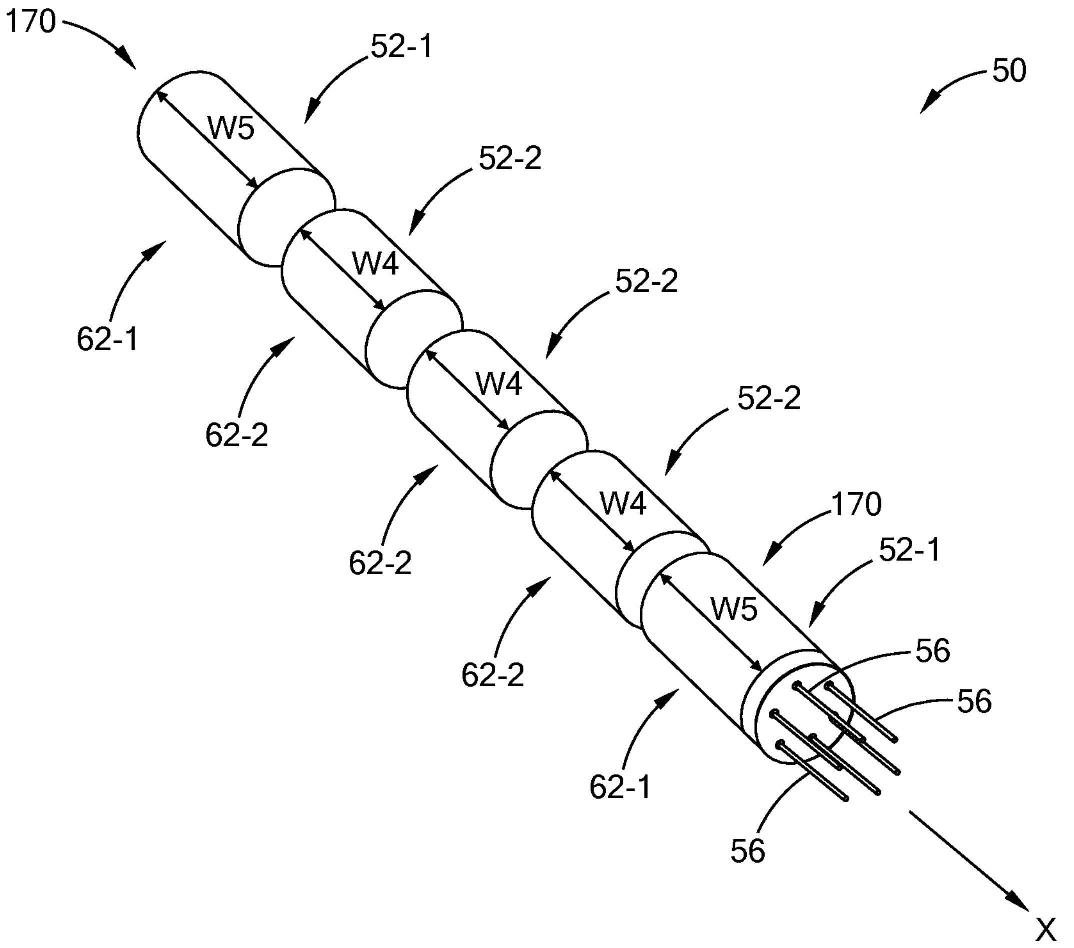
FIG. 20 is a perspective view of the heater assembly including a thermal provision in accordance with the teachings of the present disclosure.

With reference to FIG. 20, a perspective view of the heater assembly 50 with another example thermal provision is shown. In one form, the thermal provision of the heater assembly 50 is implemented by variable width thermal provision 170. The variable width thermal provision 170 includes at least one of the end heater units 52-1. In some forms, a width of the end heater units 52-1 ($W_5$) in the longitudinal direction X is greater than a width of the adjacent heater units 52-2 ($W_6$) in the longitudinal direction X. It should be understood that the width of the end heater units 52-1 ($W_5$) may be less than or equal to the width of the adjacent heater units 52-2 ($W_6$) in other forms. By selectively designating the width of the end heater units 52-1 ($W_5$) and the width of the adjacent heater units 52-2 ($W_6$), the conductance of the end heater units 52-1 relative to the adjacent heater units 52-2 can be increased to inhibit undesirable temperature gradients along the heater assembly 50. While not illustrated, it should be readily understood that the power conductors for the heater units 52 extend between the end heater units 52-1 through the adjacent heater units 52-2.

With reference to FIGS. 8-20, the controller 15 is configured to calculate a temperature within at least one of the heater units 52, such as the end heater unit 52-1, based on a predefined model (e.g., a mathematical model representing various components and/or dynamic behaviors of the heater system 10, among others) and at least one input. (This general approach can also be referred to as "virtual sensing" since temperature is calculated rather than measured). In one form, the at least one input includes, but is not limited to, a temperature at another location within the heater bundle 12, a temperature of another heater unit 52, a temperature of any one of the independently controlled heating zones 62 located on the heater assembly 18, a power consumption of the heater bundle 12 and/or any one of the heater units 52, and/or an average power consumption over a predetermined time period of the heater bundle 12 and/or any one of the heater units 52. In one form, the at least one input includes, but is not limited to, a voltage of the heater bundle 12 and/or any one of the heater units 52, a current of the heater bundle 12 and/or any one of the heater units 52, a current leakage of the heater bundle 12 and/or any one of the heater units 52, and/or an insulation resistance of the heater bundle 12. To perform the functionality described herein, the controller 15 includes one or more electrical circuits/components for obtaining the at least one input (e.g., one or more sensing circuits for measuring power of the heater units 52).

As an example, the controller 15 is configured to calculate a temperature within the end heater unit 52-1 by initially supplying a known current to the heater units 52 and measuring the voltage of the end heater unit 52-1. The controller 15 then compares the measured voltage to a nominal voltage associated with the known current to identify voltage deviations and/or corresponding resistance deviations. Subsequently, the controller 15 calculates, using the predefined model, the temperature of the end heater unit 52-1 based on the voltage deviations and/or corresponding resistance deviations. As described above, the controller 15 then modulates power to the independently controlled heating zones 62 through the power conductors 56 based on the temperature of the end heater unit 52-1. To perform the functionality described herein, the controller 15 includes one or more processors configured to execute instructions stored in a nontransitory computer-readable medium, such as a random-access memory (RAM) and/or a read-only memory (ROM). Alternatively, the controller 15 calculates temperature by supplying a known voltage to the plurality of heater units 52, measuring a current of at least one independently controlled heating zone 62, and comparing the measured current to a nominal current associated with the known voltage to identify current deviations and/or corresponding resistance deviations.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Spatial and functional relationships between elements are described using various terms, including "connected," "engaged," "coupled," "adjacent," "next to," "on top of," "above," "below," and "disposed." Unless explicitly being described as being "direct," when a relationship between first and second elements is described in the present disclosure, that relationship can be a direct relationship where no other intervening elements are present between the first and second elements, and can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure. Furthermore, various omissions, substitutions, combinations, and changes in the forms of the systems, apparatuses, and methods described herein may be made without departing from the spirit and scope of the disclosure even if said omissions, substitutions, combinations, and changes are not explicitly described or illustrated in the figures of the disclosure.

What is claimed is:

1. A heater system comprising:
a heater bundle comprising:
at least one heater assembly comprising a plurality of heater units, at least one heater unit of the plurality of heater units defining at least one independently controlled heating zone;
a plurality of power conductors electrically connected to the heater units; and
a power supply device including a controller configured to modulate power to the at least one independently controlled heating zone through the power conductors,
wherein the controller is configured to:
supply at least one input to the plurality of heater units;
measure an electrical characteristic associated with the at least one independently controlled heating zone;
compare the electrical characteristic to a nominal electrical characteristic associated with the at least one input to identify a deviation; and
calculate a temperature within the at least one heater unit based on a predefined model, the at least one input and the deviation, and the controller modulates power to the at least one heater unit based on the calculated temperature.

2. The heater system according to claim 1, wherein the at least one heater unit is an end heater unit.

3. The heater system according to claim 1, wherein the at least one input comprises a voltage of the heater bundle and/or a voltage of at least one of the heater units.

4. The heater system according to claim 1, wherein the at least one input comprises a current of the heater bundle and/or a current of at least one of the heater units.

5. The heater system according to claim 1, wherein the at least one input is a known current, the electrical characteristic is a voltage, and the nominal electrical characteristic is a nominal voltage associated with the known current.

6. The heater system according to claim 1, wherein the at least one input is a known voltage and the electrical characteristic is a current, and the nominal electrical characteristic is a nominal current associated with the known voltage.

7. An apparatus for heating fluid comprising:
a sealed housing defining an internal chamber and having a fluid inlet and a fluid outlet; and
the heater system according to claim 1, the at least one heater assembly being disposed within the internal chamber of the housing,
wherein the at least one heater assembly is adapted to provide a responsive heat distribution to a fluid within the housing.

8. The heater system according to claim 1, wherein the plurality of heater units are aligned along a longitudinal direction and the plurality of power conductors are electrically connected to the heater units along the longitudinal direction.

9. A heater system comprising:
a heater assembly comprising a plurality of heater units aligned along a longitudinal direction, at least one heater unit of the plurality of heater units defining at least one independently controlled heating zone;
a plurality of power conductors electrically connected to the heater units along the longitudinal direction; and
a power supply device including a controller configured to modulate power to the at least one independently controlled heating zone through the power conductors,
wherein the controller is configured to:
supply at least one input to the plurality of heater units;
measure an electrical characteristic associated with the at least one independently controlled heating zone;
compare the electrical characteristic to a nominal electrical characteristic associated with the at least one input to identify a deviation;
calculate temperature within the at least one heater unit based on a predefined model, the at least one input and the deviation; and
modulate power to the at least one heater unit based on the calculated temperature.

10. The heater system according to claim 9, wherein the at least one heater unit is an end heater unit.

11. An apparatus for heating fluid comprising:
a sealed housing defining an internal chamber and having a fluid inlet and a fluid outlet; and the heater system according to claim 9, the heater assembly being disposed within the internal chamber of the housing, wherein the heater assembly is adapted to provide a responsive heat distribution to a fluid within the housing.

12. The heater system according to claim 9, wherein the at least one input is a known current, the electrical characteristic is a voltage, and the nominal electrical characteristic is a nominal voltage associated with the known current.

13. The heater system according to claim 9, wherein the at least one input is a known voltage and the electrical characteristic is a current, and the nominal electrical characteristic is a nominal current associated the known voltage.

14. A heater system comprising:

a heater assembly comprising a plurality of heater units aligned along a longitudinal direction, more than one of the plurality of heater units of the plurality of heater units defining at least one independently controlled heating zone;

a plurality of power conductors electrically connected to the heater units along the longitudinal direction; and a power supply device including a controller configured to modulate power to the independently controlled heating zones through the power conductors, wherein the controller is configured to:

supply at least one input to the plurality of heater units;

measure an electrical characteristic associated with one of the at least one independently controlled heating zones;

compare the electrical characteristic to a nominal electrical characteristic associated with the at least one input to identify a deviation;

calculate temperature within the more than one heater units based on a predefined model, the at least one input and the deviation; and modulate power to the more than one heater units based on the calculated temperature.

15. The heater system according to claim 14, wherein the at least one heater unit is an end heater unit.

16. The heater system according to claim 14, wherein the at least one input is a known current, the electrical characteristic is a voltage, and the nominal electrical characteristic is a nominal voltage associated with the known current.

17. The heater system according to claim 14, wherein the at least one input is a known voltage, the electrical characteristic is a current, and the nominal electrical characteristic is a nominal current associated with the known voltage.

* * * * *